US012562951B2

(12) United States Patent
Yang et al.

(10) Patent No.: US 12,562,951 B2
(45) Date of Patent: Feb. 24, 2026

(54) ELECTRONIC DEVICE FOR HETEROGENEOUS PROTOCOL COMMUNICATION, COMMUNICATION SYSTEM INCLUDING THE SAME, AND OPERATING METHOD THEREOF

(71) Applicant: Samsung Electronics Co., Ltd., Suwon-si (KR)

(72) Inventors: Seokwon Yang, Daejeon (KR); Song Min Kim, Daejeon (KR); Minseok Kim, Daejeon (KR)

(73) Assignees: Samsung Electronics Co., Ltd., Gyeonggi-do (KR); Korea Advanced Institute of Science and Technology, Daejeon (KR)

( * ) Notice: Subject to any disclaimer, the term of this patent is extended or adjusted under 35 U.S.C. 154(b) by 110 days.

(21) Appl. No.: 18/468,986

(22) Filed: Sep. 18, 2023

(65) Prior Publication Data

US 2024/0137262 A1    Apr. 25, 2024
US 2024/0235919 A9    Jul. 11, 2024

(30) Foreign Application Priority Data

Oct. 21, 2022    (KR) ........................ 10-2022-0136848

(51) Int. Cl.
*H04L 27/38*        (2006.01)
*H04L 5/00*         (2006.01)
(Continued)

(52) U.S. Cl.
CPC ........ *H04L 27/3863* (2013.01); *H04L 5/0005* (2013.01); *H04L 25/03859* (2013.01); *H04L 27/3405* (2013.01)

(58) Field of Classification Search
CPC .............. H04L 27/3863; H04L 5/0005; H04L 25/03859; H04L 27/3405
See application file for complete search history.

(56) References Cited

U.S. PATENT DOCUMENTS 10,749,991 B2    8/2020    He et al.
11,184,272 B2    11/2021   Zhou et al.
(Continued)

FOREIGN PATENT DOCUMENTS

CN    109600771 A    4/2019
CN    109617649 A    4/2019
(Continued)

OTHER PUBLICATIONS

IEEE Standard for Low-Rate Wireless Networks—12. O-QPSK PHY (2020).
(Continued)

*Primary Examiner* — Freshteh N Aghdam
(74) *Attorney, Agent, or Firm* — Harness, Dickey & Pierce, P.L.C.

(57) ABSTRACT

Provided is an electronic device including processing circuitry configured to generate at least one signal according to a first communication protocol by referencing a lookup table, the lookup table including simulation waveform information, and the simulation waveform information simulating a second communication protocol different from the first communication protocol, and transmit the at least one signal, the at least one signal including a data packet.

20 Claims, 13 Drawing Sheets

(51) Int. Cl.
    _H04L 25/03_          (2006.01)
    _H04L 27/34_          (2006.01)

(56)                    References Cited

U.S. PATENT DOCUMENTS

| | | | | |
|---|---|---|---|---|
| 11,212,862 | B2 | 12/2021 | Yao et al. | |
| 11,611,907 | B2 * | 3/2023 | Arslan | .............. H04W 72/1215 |
| 2020/0195544 | A1 * | 6/2020 | Zhou | ..................... H04L 5/0073 |
| 2022/0006482 | A1 * | 1/2022 | He | .......................... H04L 69/22 |

FOREIGN PATENT DOCUMENTS

| | | | | |
|---|---|---|---|---|
| CN | 110855713 | B | * 10/2020 | ........... H04B 17/318 |
| CN | 11330752 | A | * 11/2021 | ............ H04W 76/14 |
| EP | 3668035 | A1 | 6/2020 | |
| KR | 101771639 | B1 | 8/2017 | |

OTHER PUBLICATIONS 802.11g-2003—IEEE Standard for Information technology—Local and metropolitan area networks—Specific requirements—Part 11: Wireless LAN Medium Access Control (MAC) and Physical Layer (PHY) Specifications: Amendment 4: Further Higher Data Rate Extension in the 2.4 GHz Band.
802.11-1999—IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications.

* cited by examiner

FIG. 8

| Data symbol | Chip values ($c_0$ $c_1$ ... $c_{30}$ $c_{31}$) |
|---|---|
| 0 | 1 1 0 1 1 0 0 1 1 1 0 0 0 0 1 1 0 1 0 1 0 0 1 0 0 0 1 0 1 1 1 0 |
| 1 | 1 1 1 0 1 1 0 1 1 0 0 1 1 1 0 0 0 0 1 1 0 1 0 1 0 0 1 0 0 0 1 0 |
| 2 | 0 0 1 0 1 1 1 0 1 1 0 1 1 0 0 1 1 1 0 0 0 0 1 1 0 1 0 1 0 0 1 0 |
| 3 | 0 0 1 0 0 0 1 0 1 1 1 0 1 1 0 1 1 0 0 1 1 1 0 0 0 0 1 1 0 1 0 1 |
| 4 | 0 1 0 1 0 0 1 0 0 0 1 0 1 1 1 0 1 1 0 1 1 0 0 1 1 1 0 0 0 0 1 1 |
| 5 | 0 0 1 1 0 1 0 1 0 0 1 0 0 0 1 0 1 1 1 0 1 1 0 1 1 0 0 1 1 1 0 0 |
| 6 | 1 1 0 0 0 0 1 1 0 1 0 1 0 0 1 0 0 0 1 0 1 1 1 0 1 1 0 1 1 0 0 1 |
| 7 | 1 0 0 1 1 1 0 0 0 0 1 1 0 1 0 1 0 0 1 0 0 0 1 0 1 1 1 0 1 1 0 1 |
| 8 | 1 0 0 0 1 1 0 0 1 0 0 1 0 1 1 0 0 0 0 0 1 1 0 1 1 1 1 0 1 1 |
| 9 | 1 0 1 1 1 0 0 0 1 1 0 0 1 0 0 1 0 1 1 0 0 0 0 0 1 1 1 0 1 1 1 |
| 10 | 0 1 1 1 1 0 1 1 1 0 0 0 1 1 0 0 1 0 0 1 0 1 1 0 0 0 0 0 1 1 1 |
| 11 | 0 1 1 1 0 1 1 1 1 0 1 1 0 0 0 1 1 0 0 1 0 0 1 0 1 1 0 0 0 0 0 |
| 12 | 0 0 0 0 0 1 1 1 0 1 1 1 1 0 1 1 0 0 0 1 1 0 0 1 0 0 1 0 1 1 0 |
| 13 | 0 1 1 0 0 0 0 0 0 1 1 1 0 1 1 1 1 0 1 1 0 0 0 1 1 0 0 1 0 0 1 |
| 14 | 1 0 0 1 0 1 1 0 0 0 0 0 0 1 1 1 0 1 1 1 1 0 1 1 0 0 0 1 1 0 0 |
| 15 | 1 1 0 0 1 0 0 1 0 1 1 0 0 0 0 0 0 1 1 1 0 1 1 1 1 0 1 1 1 0 0 0 |

FIG. 9

| symbol | chip | Optimal phase ($\theta$) |
|--------|------|--------------------------|
| 0 | 11011.....1110 | $-54°$ |
| 1 | 11101.....0010 | $118°$ |
| ⋮ | ⋮ | ⋮ |
| 15 | 11001.....1000 | $-68°$ |

FIG. 10

| ZigBee Symbol | OPTIMAL MAGNITUDE OF PHASE DIFFERENCE BETWEEN SAMPLES ($\theta_1\ \theta_2\ \theta_3\ \cdots\ \theta_{32}$ (UNIT°)) |
|---|---|
| 0 | |
| 1 | |
| 2 | |
| 3 | |
| 4 | |
| 5 | |
| 6 | |
| 7 | |
| 8 | |
| 9 | |
| 10 | |
| 11 | |
| 12 | |
| 13 | |
| 14 | |
| 15 | |

ELECTRONIC DEVICE FOR HETEROGENEOUS PROTOCOL COMMUNICATION, COMMUNICATION SYSTEM INCLUDING THE SAME, AND OPERATING METHOD THEREOF

CROSS-REFERENCE TO RELATED APPLICATION

This application is based on and claims priority under 35 U.S.C. § 119 to Korean Patent Application No. 10-2022-0136848, filed on Oct. 21, 2022, in the Korean Intellectual Property Office, the disclosure of which is hereby incorporated by reference herein in its entirety.

BACKGROUND

The inventive concepts relate to an electronic device for heterogeneous protocol communication, and more particularly, to an electronic device for performing heterogeneous protocol communication using signal simulation freedom, a communication system including the same, and an operating method thereof.

Due to the development of communication technology, various radio access technologies (RATs) are being developed and commercialized. Accordingly, in order to meet more diverse consumer demand for wireless communication services, electronic devices are developing to support various types of communication protocols. In addition, techniques for coupling between heterogeneous protocols have been proposed.

As a representative method for communication between heterogeneous protocols, there is a method of installing a gateway or changing hardware, firmware, etc. However, these methods increase overhead, such as time and traffic.

SUMMARY

Embodiments provide electronic devices that perform communication between heterogeneous protocols without additional changes of gateway, hardware, and firmware. The inventive concepts provide an electronic device for storing a lookup table containing optimal simulation waveform information and transmitting a signal containing a data packet to a reception device by referring to the lookup table, in heterogeneous protocol communication, and a communication system including the same and an operating method thereof.

According to an aspect of the inventive concepts, there is provided an electronic device including processing circuitry configured to generate at least one signal according to a first communication protocol by referencing a lookup table, the lookup table including simulation waveform information, and the simulation waveform information simulating a second communication protocol different from the first communication protocol, and transmit the at least one signal, the at least one signal including a data packet.

According to an aspect of the inventive concepts, there is provided an operating method of an electronic device, the operating method including determining a plurality of simulation waveform candidates based on a first communication protocol, selecting a first simulation waveform candidate having a smallest quadrature amplitude modulation (QAM) quantization error among the plurality of simulation waveform candidates, storing a lookup table including simulation waveform information corresponding to the first simulation waveform candidate, and transmitting at least one signal including a data packet to a reception device operating according to a second communication protocol, the at least one signal being generated by referencing the lookup table.

According to an aspect of the inventive concepts, there is provided a communication system including an electronic device operating according to a first communication protocol, and a reception device operating according to a second communication protocol, wherein the electronic device is configured to store a lookup table including simulation waveform information, generate at least one signal by referencing the lookup table, and transmit the at least one signal to the reception device, the at least one signal including a data packet, and the reception device is configured to differentially demodulate the at least one signal based on the second communication protocol.

BRIEF DESCRIPTION OF THE DRAWINGS

Embodiments of the inventive concepts will be more clearly understood from the following detailed description taken in conjunction with the accompanying drawings in which:

FIG. 8 illustrates a ZigBee® direct sequence spread spectrum (DSSS) table according to embodiments of the inventive concepts;

FIG. 9 is a table diagram illustrating optimal simulation waveform information based on total phase rotation for a ZigBee® symbol according to embodiments of the inventive concepts;

FIG. 10 is a table diagram illustrating optimal simulation waveform information based on magnitude of phase difference between samples for a ZigBee® symbol according to embodiments of the inventive concepts.

DETAILED DESCRIPTION

Hereinafter, embodiments of the inventive concepts will be described in detail with reference to the accompanying drawings.

Figure 1:
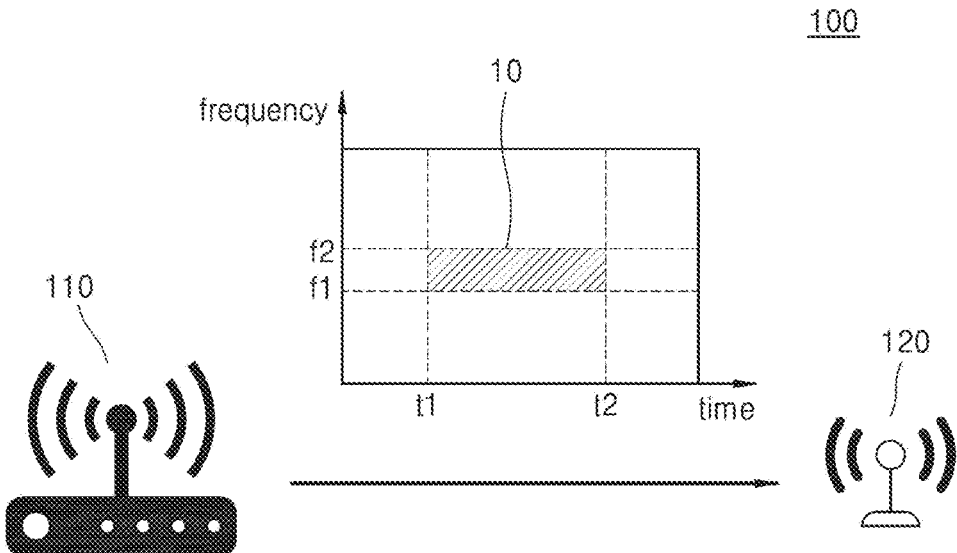
FIG. 1 is a diagram illustrating a communication system according to embodiments of the inventive concepts.

FIG. 1 is a diagram illustrating a communication system 100 according to embodiments of the inventive concepts. For reference, the communication system 100 may correspond to a radio access technology (RAT), for example, wireless communication system using cellular network, such as a 5th generation (5G) wireless communication system, a long term evolution (LTE) communication system, an LTE-advanced communication system, a code division multiple access (CDMA) communication system, and/or a Global System for Mobile Communications (GSM) communication system, and/or alternatively, Wireless Local Area Network (WLAN) communication system or any other wireless communication system.

Referring to FIG. 1, the communication system 100 may include an electronic device 110 and/or a reception device 120. At least one of the electronic device 110 or the reception device 120 may be a router. However, the technical idea of the inventive concepts is not limited thereto, and the electronic device 110 and/or the reception device 120 may be any electronic device 110 or reception device 120 capable of transmitting and receiving data packets, such as a desktop, a smartphone, or a tablet PC.

The electronic device 110 may operate according to a first communication protocol. For example, the first communication protocol may include WiFi®.

The electronic device 110 may transmit at least one signal including a data packet to the reception device 120. The electronic device 110 may comply with the WiFi® standard, such as the IEEE 802.11ax/n/g orthogonal frequency-division multiplexing (OFDM) standard. The electronic device 110 may generate a waveform that simulates a second communication protocol by substituting a specific symbol on a subcarrier 10 corresponding to a channel of the second communication protocol among signals transmitted to the reception device 120. For example, the subcarrier 10 may have a first time range t1 to t2 and a first frequency range f1 to f2. Here, the symbol may mean a command for performing an instruction. In embodiments, the symbol substituted for the subcarrier 10 may be derived through reverse engineering of a WiFi® transmission process to be described later.

The electronic device 110 may generate a data packet using the first communication protocol. More specifically, the electronic device 110 may generate a data packet such that at least one signal including the data packet is readable by the reception device 120 using the second communication protocol.

The reception device 120 may operate according to the second communication protocol. In this disclosure, the second communication protocol may refer to any communication protocol that differentially demodulates a signal received from the electronic device 110. Here, the differential demodulation may mean demodulation based on a phase difference between adjacent samples. When demodulating based on the phase difference between adjacent samples, even if adjacent samples are shifted by the same phase (or similar phases), the phase difference between adjacent samples is the same (or similar) and demodulation may be performed to the same value (or similar values). For example, the second communication protocol may include any one of ZigBee® and Bluetooth®.

The electronic device 110 and the reception device 120 may be configured to operate according to different communication protocols. The reception device 120 may be configured not to operate according to the first communication protocol, and the electronic device 110 may be configured not to operate according to the second communication protocol. For example, according to embodiments, the reception device 120 may not be configured to operate according to the first communication protocol, and the electronic device 110 may not be configured to operate according to the second communication protocol.

In order to communicate with the reception device 120 operating according to the second communication protocol, the electronic device 110 may generate a signal closest or closer to the second communication protocol, that is, a signal having an optimal simulation waveform. The optimal simulation waveform may be selected from among a plurality of simulation waveform candidates using a degree of freedom of signal simulation through differential demodulation characteristics of the reception device 120. According to embodiments, the term "optimal" as used herein (e.g., with respect to the terms "optimal simulation waveform," "optimal simulation waveform information," "optimal waveform information," etc.) refers to a simulation waveform (e.g., a first simulation waveform candidate) determined to correspond to a lowest amount of error (e.g., Quadrature Amplitude Modulation (QAM) quantization error) among simulation waveforms. Likewise, according to embodiments, the terms "optimal phase values," "optimal samples," etc., correspond to values adjusted to obtain the simulation waveform determined to correspond to the lowest amount of error among the simulation waveforms.

As described above, the electronic device 110 according to embodiments of the inventive concepts may select an optimal simulation waveform from among a plurality of simulation waveform candidates using a signal simulation freedom degree through differential demodulation characteristics.

In addition, the electronic device 110 according to embodiments of the inventive concepts may implement communication between heterogeneous communication protocols without changes in gateways, hardware, and firmware, and with no additional time overhead.

Figure 2:
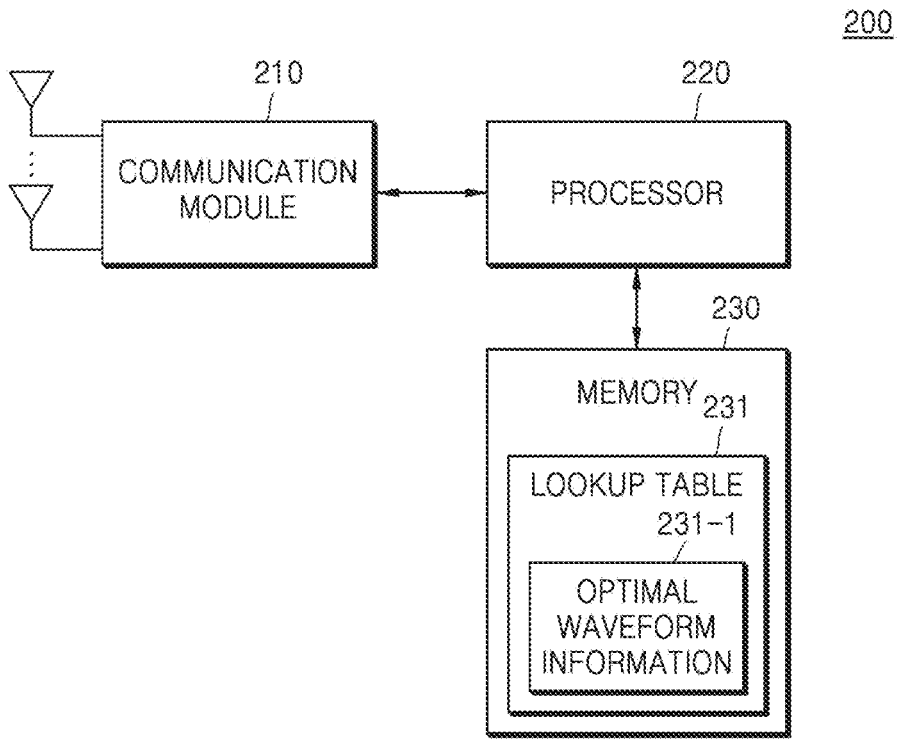
FIG. 2 is a block diagram illustrating an electronic device according to embodiments of the inventive concepts.

FIG. 2 is a block diagram illustrating an electronic device according to embodiments of the inventive concepts.

Referring to FIG. 2, the electronic device 200 may include a communication module 210, a processor 220, and/or a memory 230. The communication module 210 may include a plurality of antennas. According to embodiments, the electronic device 200 may be used to implement the electronic device 110.

Meanwhile, the implementation of the electronic device 200 shown in FIG. 2 is only an example, and is not limited thereto, and the electronic device 200 may include more or less configurations (e.g., more or less components in one or more different configurations).

The communication module 210 may perform functions for transmitting and/or receiving a signal through a wireless channel, such as band conversion and/or amplification of a signal.

The communication module 210 may generate complex symbols by encoding and modulating a transmission bit string when transmitting data. In addition, the communication module 210 may reconstruct a reception bit string by demodulating and decoding a received signal when receiving data.

The communication module 210 may transmit and receive signals as described above. The communication module 210 may be referred to as a transmission unit, a reception unit, a transmission/reception unit, or a communication unit.

The processor 220 may control overall operations of the electronic device 200. In embodiments, the processor 220 may control the communication module 210 to transmit at least one signal including a data packet to the reception device (e.g., 120 in FIG. 1) referring to a lookup table 231 stored in the memory 230.

The memory 230 may store data, such as a basic program, an application program, and/or configurational information for an operation of the electronic device 200. In addition, the processor 220 may control the memory 230 to store a lookup table 231 containing optimal waveform information 231-1 (also referred to herein as optimal simulation waveform information 231-1) according to embodiments of the inventive concepts. Accordingly, the processor 220 may generate a signal to be transmitted to the reception device 120 without time overhead by referring to the lookup table 231 stored in the memory 230 and generating a signal corresponding to the optimal simulation waveform.

The optimal waveform information 231-1 may refer to information on a waveform having a smallest Quadrature Amplitude Modulation (QAM) quantization error among a plurality of simulation waveform candidates. The QAM quantization error may refer to an error occurring in a QAM demapping process. For example, the QAM quantization error may occur in the QAM demapping process, which is one of the inverse processes of the WiFi® protocol. Specifically, the quantization error may mean an error caused by a Euclidean distance between the second communication protocol constellation point to be simulated and the first communication protocol mapping constellation point. The QAM quantization error will be described in detail with reference to FIG. 5.

Figure 3:
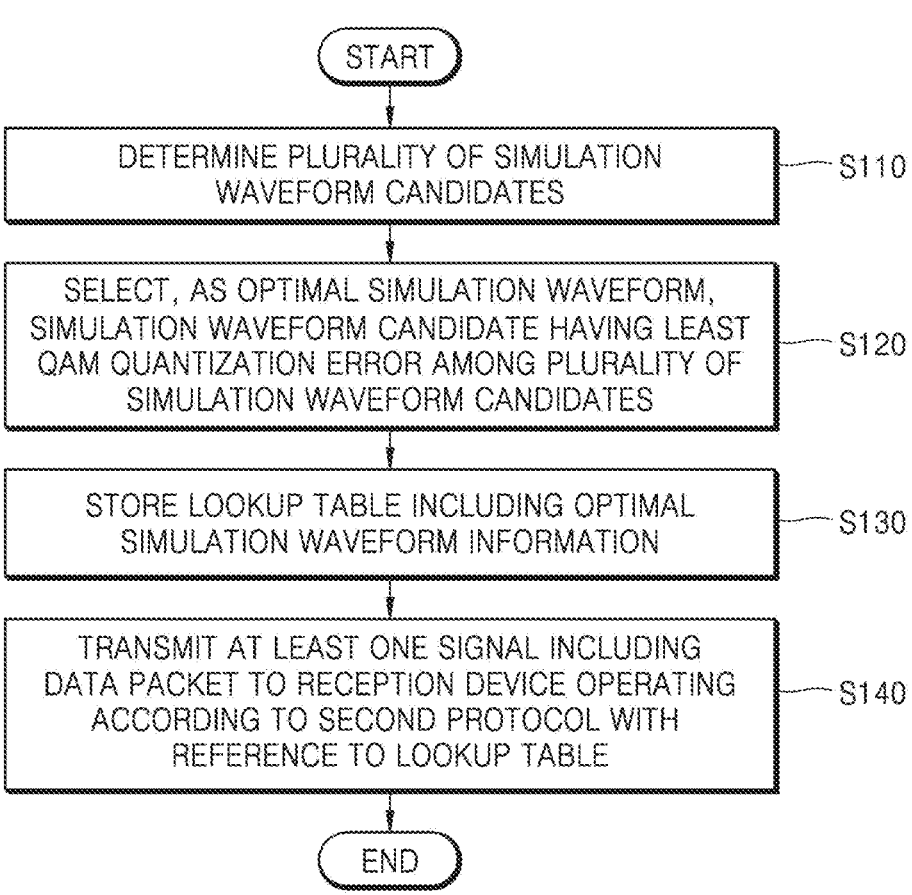
FIG. 3 is a flowchart illustrating an operating method of an electronic device according to embodiments of the inventive concepts.

FIG. 3 is a flowchart illustrating a method of operating an electronic device according to embodiments of the inventive concepts. FIGS. 3 to 11B may be described with reference to FIG. 1 described above.

Referring to FIG. 3, the method of operating the electronic device 110 may include operations S110 to S140.

In operation S110, the electronic device 110 may determine a plurality of simulation waveform candidates.

In embodiments, the electronic device 110 may determine a plurality of simulation waveform candidates by adjusting a total phase rotation quantity of a target signal based on the second communication protocol. In this disclosure, the target signal may mean a signal according to the second communication protocol (e.g., a signal configured according to the second communication protocol). For example, when the second communication protocol is ZigBee®, the target signal may be a standard ZigBee® signal. The standard ZigBee® signal may be a signal generated by rotating at +90° or −90° starting at (1,0) on the I/Q plane. However, this is only an example, and the starting point and the rotation angle of the target signal may be set differently.

In embodiments, the electronic device 110 may determine the plurality of simulation waveform candidates by adjusting a magnitude of a phase difference between samples of a target signal based on the second communication protocol. For example, the simulation waveform candidates may be determined by adjusting the magnitude of the phase difference between samples of the target signal to 60°, 75°, 120°, etc.

In embodiments, the electronic device 110 may determine the plurality of simulation waveform candidates by adjusting an amplitude of a target signal based on the second communication protocol. For example, candidates for simulation waveforms may be determined by adjusting the amplitude magnitude of the target signal to ⅓ times, ½ times, 2 times, 3 times, etc. According to embodiments, the adjustment of the total phase rotation quantity, the phase difference magnitude between samples, and/or the amplitude of the target signal may be performed based on the first communication protocol such that the resulting simulation waveform candidates may be generated (e.g., expressed) using the first communication protocol.

In operation S120, the electronic device 110 may select, as an optimal simulation waveform, a waveform corresponding to the simulation waveform candidate having the smallest QAM quantization error among a plurality of simulation waveform candidates. In other words, the electronic device 110 may calculate the QAM quantization errors of the plurality of simulation waveform candidates determined in operation S110 and select, as the optimal simulation waveform, a simulation waveform candidate having the smallest QAM quantization error. According to embodiments, the electronic device 110 may calculate the QAM quantization error associated with each respective simulation waveform candidate among the plurality of simulation waveform candidates using the same approach as, or a similar approach to, that discussed in connection with FIG. 5 below.

In operation S130, the electronic device 110 may store a lookup table including optimal simulation waveform information (e.g., the lookup table 231 stored in the memory 230). For example, the electronic device 110 may generate information corresponding to the optimal simulation waveform and store a lookup table including the same. According to embodiments, the electronic device 110 may store an entire phase of the optimal simulation waveform in the lookup table.

The electronic device 110 may enable communication between the first communication protocol and the second communication protocol without additional time overhead by storing optimal simulation waveform information corresponding to the second communication protocol symbol in the form of the lookup table.

In operation S140, the electronic device 110 may transmit at least one signal including a data packet to the reception device 120 operating according to the second communication protocol with reference to the lookup table. According to embodiments, operation S140 may include generating the at least one signal based on the optimal simulation waveform by referring to the lookup table. According to embodiments, the electronic device 110 may repeat operation S140, to generate and transmit another signal including another data packet by referring to the lookup table, without repeating operations S110-S130. According to embodiments, the reception device 120 may receive the at least one signal and obtain the data packet (e.g., decode, demodulate, etc. the data packet) using the second communication protocol.

The electronic device 110 may transmit at least one signal including a data packet corresponding to the symbol by referring to the lookup table stored in operation S130.

Figure 4:
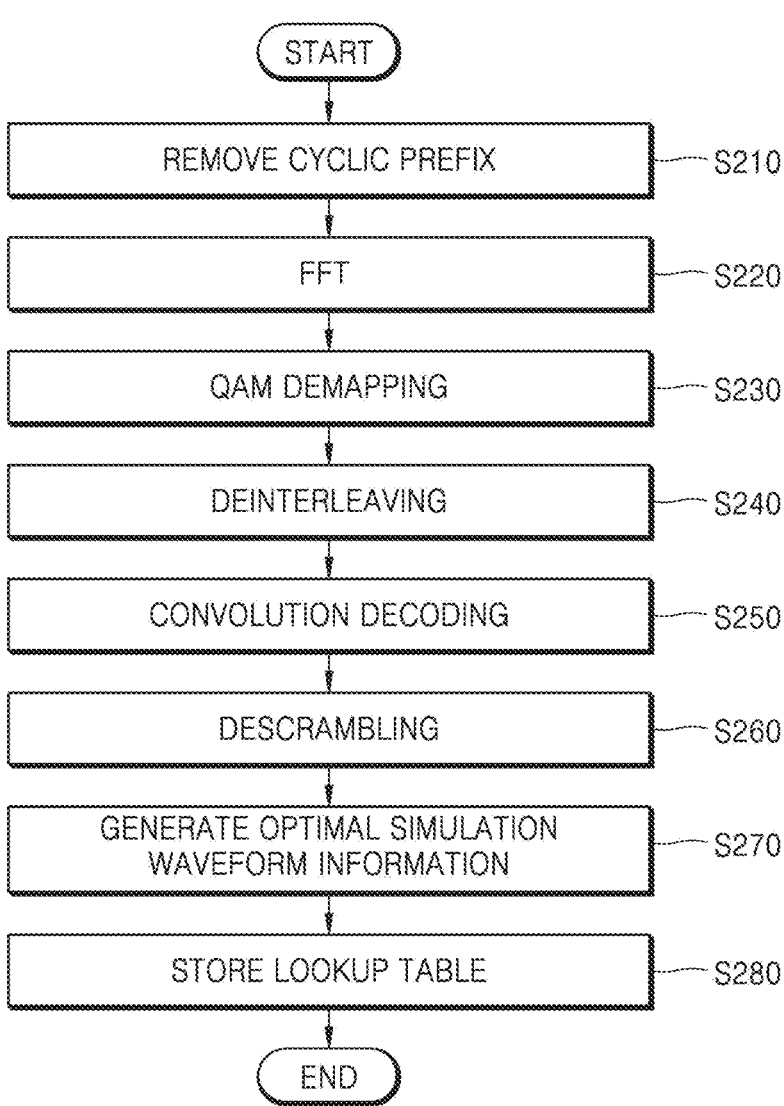
FIG. 4 is a flowchart illustrating an operating method of an electronic device that generates optimal simulation waveform information corresponding to an optimal simulation waveform and stores a lookup table including the same.

FIG. 4 is a flowchart illustrating an operating method of an electronic device 110 that generates optimal simulation waveform information corresponding to an optimal simulation waveform and stores a lookup table including the same. FIG. 4 may refer to embodiments of operation S130 of FIG. 3. That is, FIG. 4 may mean an operation after selecting the optimal simulation waveform in operation S120 of FIG. 3.

FIG. 4 illustrates a case where the first communication protocol is WiFi® and the second communication protocol is ZigBee®. However, the technical idea of this disclosure is not limited thereto, and may be set differently by a person skilled in the art. Operations S210 to S270 of FIG. 4 may refer to operations for finding which physical layer convergence procedure (PLCP) Service Data Unit (PSDU) bit the electronic device 110 according to the first communication protocol should generate to generate a waveform closest or closer to the optimal simulation waveform. Operation S280 may mean an operation of storing a lookup table including optimal simulation waveform information generated through operations S210 to S270. Operations S210 to S270 may be an inverse process of a WiFi® protocol transmission process. In other words, operations S210 to S270 may refer to reverse engineering that tracks the WiFi® transmission process in reverse.

In operation S210, the electronic device 110 may remove a cyclic prefix (CP). Since a signal transmitted from a WiFi® protocol includes a CP, the electronic device 110 may remove the CP to transmit the signal to the reception device 120 following a ZigBee® protocol.

In operation S220, the electronic device 110 may perform a fast Fourier transform (FFT). Since an inverse fast Fourier transform (IFFT) is performed in WiFi® modulation, the electronic device 110 may perform FFT, which is an inverse of IFFT, in operation S220.

Figure 5:
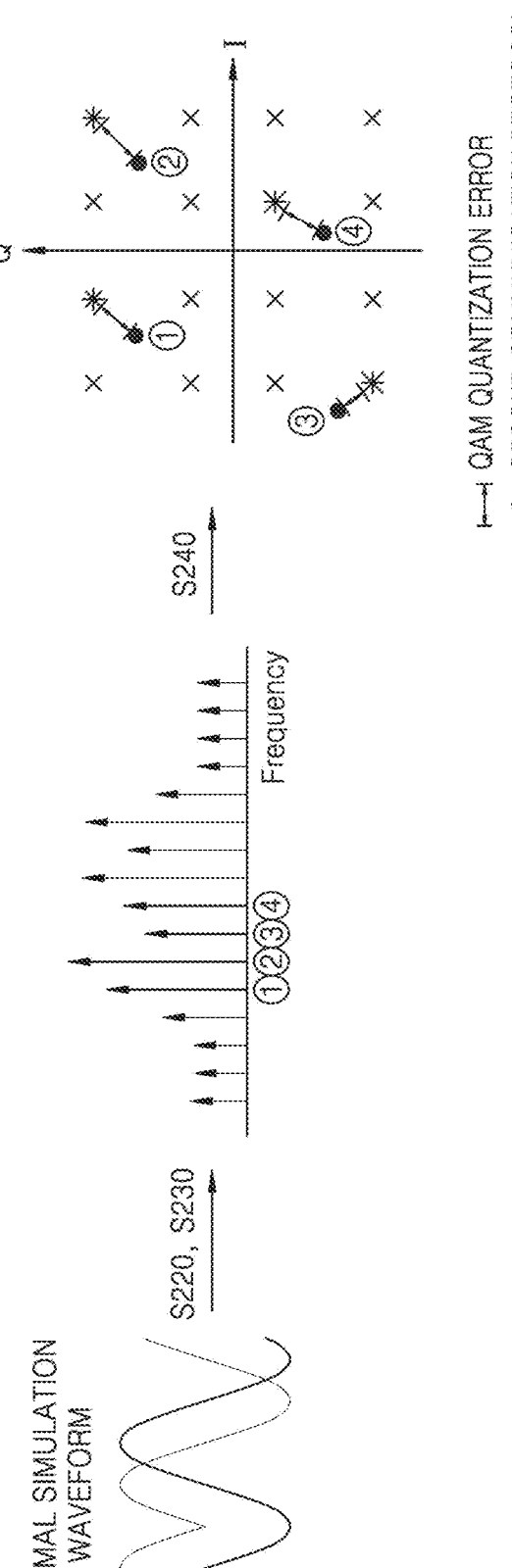
FIG. 5 is a diagram illustrating operations S220 to S240 of the method of FIG. 4.

In operation S230, the electronic device 110 may perform QAM demapping. The electronic device 110 may perform QAM demapping on the optimal simulation waveform after the FFT. Referring to FIG. 5, the electronic device 110 may determine a mapping constellation point closest (or closer) to the second communication protocol constellation point obtained through constellation of the optimal simulation waveform. The electronic device 110 may demap the optimal simulation waveform to a mapping constellation point closest (or closer) to the second communication protocol constellation point. However, when the second communication protocol constellation point and the mapping constellation point do not exactly match, a QAM quantization error may occur due to the Euclidean distance between the two points. That is, noise/distortion or the like may occur during signal demodulation due to a difference between a waveform that the electronic device 110 may generate and an optimal simulation waveform.

In operation S240, the electronic device 110 may perform deinterleaving. Since an interleaving operation of changing the position of data is performed to operate robustly against noise in the WiFi® protocol, the electronic device 110 may perform a deinterleaving operation that is the inverse of the interleaving operation in operation S240.

In operation S250, the electronic device 110 may perform convolution decoding. In order to obtain a channel coding value, convolution decoding, which is the inverse of the WiFi® convolution encoding, may be performed.

In operation S260, the electronic device 110 may perform descrambling. For a reason similar to operation S240, since a scrambling operation of changing the position of data is performed in the WiFi® protocol, the electronic device 110 may perform a scrambling operation that is the inverse of the scrambling operation in operation S260.

In operation S270, the electronic device 110 may generate optimal simulation waveform information. After the scrambling, the electronic device 110 may determine a PLCP Service Data Unit (PSDU) bit for generating a signal having a waveform closest or closer to an optimal simulation waveform. In the present disclosure, information for generating a signal having a waveform closest or closer to an optimal simulation waveform, for example, a PSDU bit, may be referred to as optimal simulation waveform information.

In operation S280, the electronic device 110 may store a lookup table including optimal simulation waveform information. For example, the processor 220 of FIG. 2 may store, in the memory 230, the lookup table 231 including the optimal simulation waveform information 231-1 generated in operation S270.

FIG. 5 is a diagram illustrating operations S220 to S240 of FIG. 4.

Referring to FIG. 5, when the electronic device 110 performs FFT of operation S220 and QAM demapping of operation S230, with respect to the optimal simulation waveform, the amplitude magnitude of the subcarrier according to the frequency may be obtained.

In operation S240, the electronic device 110 may perform second communication protocol constellation on each of the subcarriers for each frequency. FIG. 5 illustrates the second communication protocol constellation of subcarriers having frequencies ①, ②, ③, and ④. The points undergoing constellation may not match mapping constellation points according to the first communication protocol. Therefore, a QAM quantization error may occur due to the Euclidean distance between the points where each subcarrier is constellated and the mapping constellation points. In other words, a QAM quantization error may occur due to a difference between the second communication protocol constellation point obtained by constellating the optimal simulation waveform to be simulation and the mapping constellation point, which is a point implementable in the first communication protocol.

Figure 6:
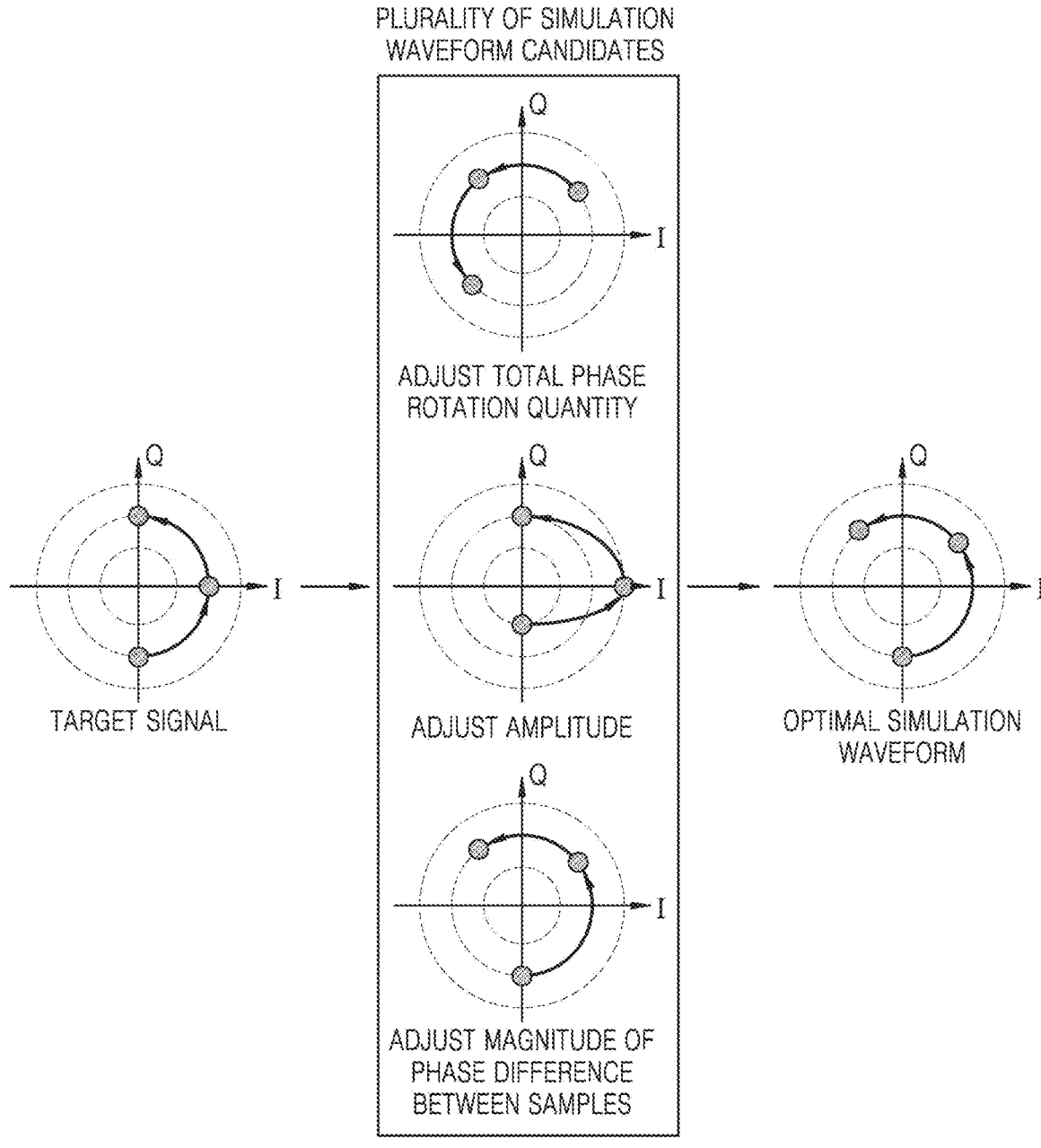
FIG. 6 is a diagram illustrating an operation of selecting an optimal simulation waveform of an electronic device according to embodiments of the inventive concepts.

FIG. 6 is a diagram illustrating an operation of selecting an optimal simulation waveform of an electronic device according to embodiments of the inventive concepts.

Referring to FIG. 6, the electronic device 110 may generate a plurality of simulation waveform candidates using a target signal based on a second communication protocol.

In embodiments, the electronic device 110 may generate a plurality of simulation waveform candidates by adjusting a total phase rotation quantity of the target signal. In embodiments, the electronic device 110 may generate a plurality of simulation waveform candidates by adjusting an amplitude of the target signal. In embodiments, the electronic device 110 may generate a plurality of simulation waveform candidates by adjusting the magnitude of the phase difference between samples of the target signal.

The electronic device 110 may select, as an optimal simulation waveform, a simulation waveform having a smallest QAM quantization error among the plurality of simulation waveform candidates generated as described above.

Figure 7A:
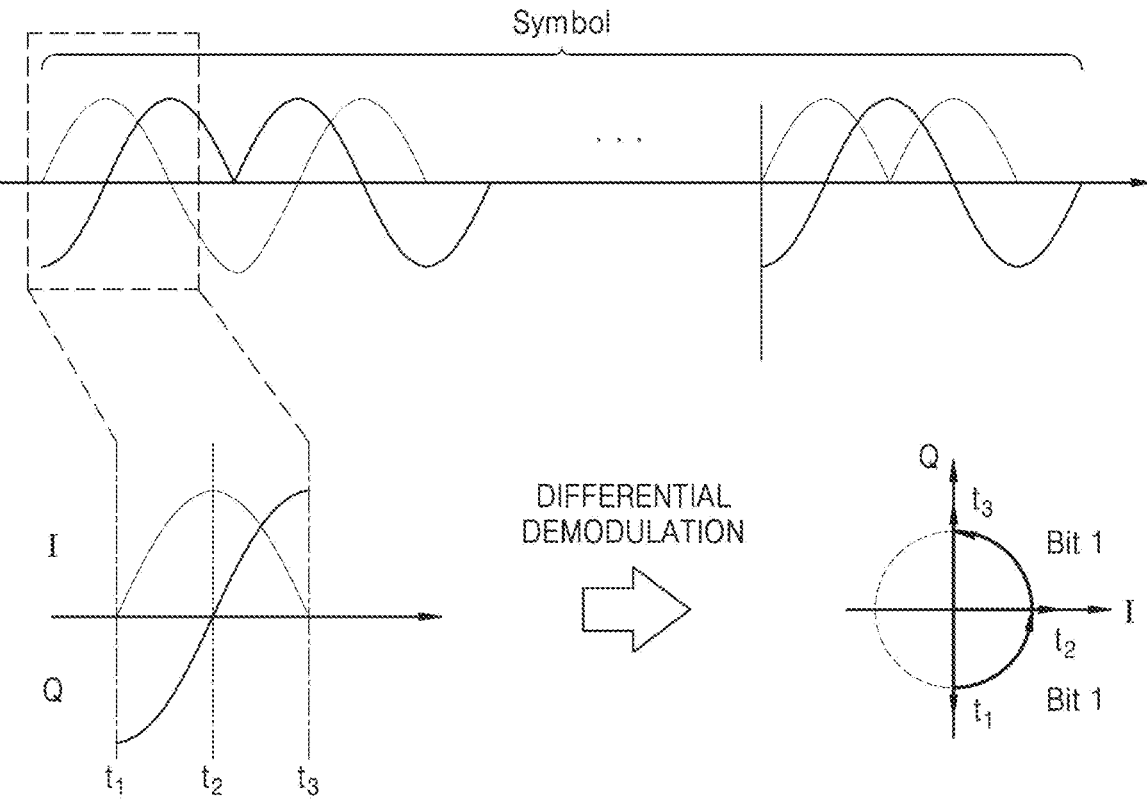
FIGS. 7A and 7B are diagrams illustrating a differential demodulation operation of a reception device according to embodiments of the inventive concepts.
Figure 7B:
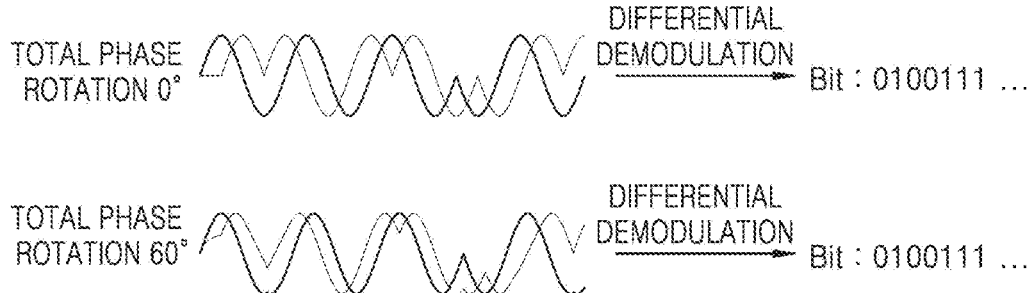

FIGS. 7A and 7B are diagrams illustrating a differential demodulation operation of a reception device 120 according to embodiments of the inventive concepts.

FIGS. 7A and 7B may be described with reference to FIG. 1. Referring to FIG. 7A, a case in which a part of a symbol on an I/Q plane is differentially demodulated is illustrated. For example, a t1, the coordinates of a sample on the I/Q plane may be (0, −1). At t2, the coordinates of the sample on the I/Q plane may be (1, 0). At t3, the coordinates of the sample on the I/Q plane may be (0, 1). Differential demodulation may be performed based on a phase difference between consecutive samples. For example, when the phase between consecutive samples increases, the demodulation may be performed to bit 1, and when the phase decreases, the demodulation may be performed to bit 0.

At t1, the phase of the sample is −90°, and at t2, the phase of the sample is 0°, so the phase between consecutive samples from t1 to t2 increases. Accordingly, the reception device 120 may demodulate samples continuous from t1 to t2 into 1-bit values.

At t2, the phase of the sample is 0°, and at t3, the phase of the sample is 90°, so the phase between consecutive samples from t2 to t3 increases. Accordingly, the reception device 120 may demodulate samples continuous from t2 to t3 into 1-bit values.

Referring to 7B, even if the electronic device 110 shifts the entire phase of the signal according to the second communication protocol, the signal may be demodulated to the same value (or similar values). For example, in both cases where the entire phase of the target signal is rotated by 0° and 60°, the demodulation may be performed to 0100111, which is the same bit (e.g., the same bit sequence). However, this is only an example, and since the reception device 120 performs differential demodulation, demodulation may be performed to the same bit (or similar bits) even if the electronic device 110 adjusts the amplitude of the signal or the magnitude of the phase difference between samples according to the second communication protocol.

FIG. 8 illustrates a ZigBee® DSSS table according to embodiments of the inventive concepts. The DSSS table represents chip values according to a data symbol. In the ZigBee® communication protocol, bit values may be referred to as chip values. For example, when the electronic device 110 transmits a data symbol corresponding to "0" to the reception device 120, a signal having a chip value of 11011001110000110101001000101110 may be transmitted. Here, 1 may correspond to an increase in phase between consecutive samples, and 0 may correspond to a decrease in phase between consecutive samples.

FIG. 9 is a table diagram illustrating optimal simulation waveform information based on total phase rotation for a ZigBee® symbol according to embodiments of the inventive concepts.

Referring to FIG. 9, chip values and optimal phase values for differential demodulation are illustrated according to data symbols, respectively. For example, in order to reduce the QAM quantization error, the electronic device 110 may transmit a signal obtained by rotating the entire phase by −54° when transmitting a data symbol of 0.

FIG. 10 is a table diagram illustrating optimal simulation waveform information based on magnitude of phase difference between samples for a ZigBee® symbol according to embodiments of the inventive concepts.

Referring to FIG. 10, phase difference sizes between optimal samples for differential demodulation according to data symbols are illustrated. For example, in order to reduce the QAM quantization error, when the electronic device 110 transmits a data symbol of 0, a signal obtained by rotating the magnitude of the phase difference size between samples by 120°, 60°, 60°, −120°, . . . , may be transmitted.

Figure 11A:
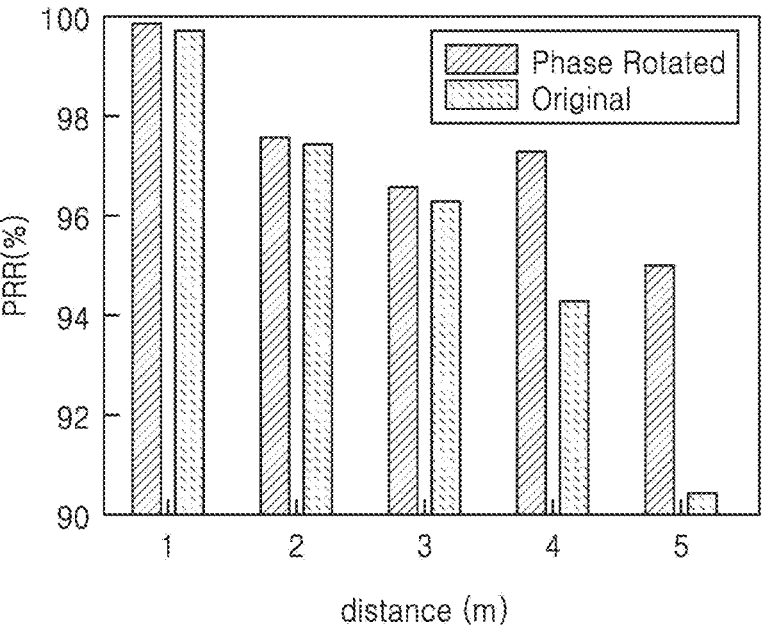
FIGS. 11A and 11B are graphical views illustrating a PRR according to a Los/NLos distance.
Figure 11B:
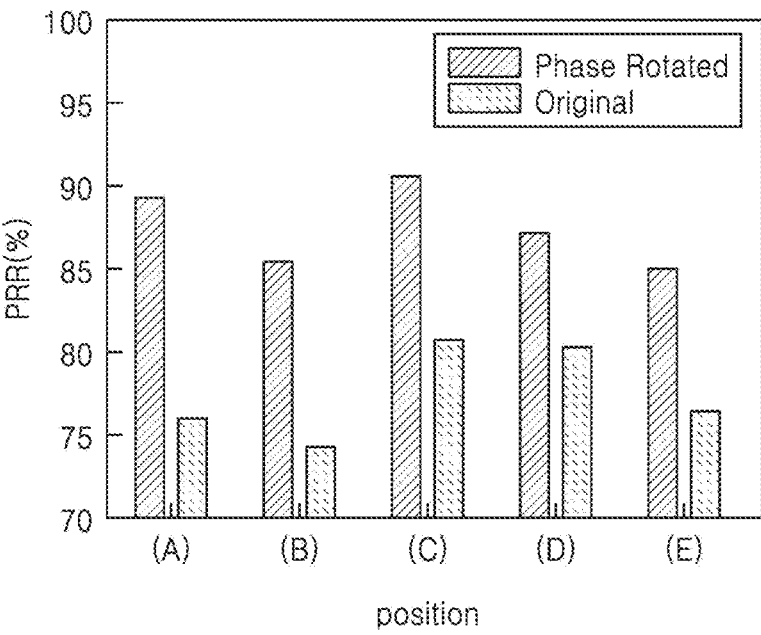

FIGS. 11A and 11B are graphical views illustrating a PRR according to a Los/NLos distance.

FIG. 11A shows a packet reception ratio (PRR) according to a line of sight (LoS) distance, and FIG. 11B shows a PRR according to a non-line of sight (NLoS) distance. In this disclosure, LoS refers to a case where a signal between the electronic device 110 and the reception device 120 directly reaches, and NLoS refers to a case where a signal transmitted from the electronic device 110 is covered by an obstacle or the like, and propagated by diffraction, reflection, and the like. In both the LoS distance of FIG. 11A or the NLoS distance of FIG. 11B, the PRR is higher when the entire phase is rotated.

Conventional devices and methods for coupling between heterogeneous wireless communication protocols rely on installation of a gateway, or changing hardware, firmware, etc., of a communicating device. Such reliance on additional equipment and/or software involves excessive resource consumption (e.g., physical space on the communicating device, memory, delay, expense, etc.).

However, according to embodiments, improved devices and methods are provided for coupling between heterogeneous wireless communication protocols. For example, the improved devices and methods may generate a signal according to a first communication protocol based on simulation waveform information simulating a second communication protocol, different from the first communication protocol. In some examples, the second communication protocol may include differential demodulation. The signal generated using the first communication protocol may be capable of being accurately received via the second communication protocol. Accordingly, the improved devices and methods overcome the deficiencies of the conventional devices and methods to at least enable coupling between heterogeneous wireless communication protocols without reliance on additional equipment and/or software (e.g., gateway, hardware, firmware, etc.), thereby reducing resource consumption (e.g., physical space on the communicating device, memory, delay, expense, etc.). Also, according to embodiments, the improved devices and methods may store the simulation waveform information (e.g., in a lookup table), and the signal may be generated by referring to the stored simulation waveform information. Accordingly, the improved devices and methods enable coupling between the first and second communication protocols without additional time overhead (e.g., excessive delay).

According to embodiments, operations described herein as being performed by the communication system 100, the electronic device 110, the reception device 120, the electronic device 200, the communication module 210 and/or the processor 220 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with modules and/or devices discussed in more detail herein. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

Although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. As used herein the term "and/or" includes any and all combinations of one or more of the associated listed items.

While the inventive concepts have been particularly shown and described with reference to embodiments thereof, it will be understood that various changes in form and details may be made therein without departing from the spirit and scope of the following claims.

What is claimed is:

1. An electronic device comprising:
a communication module configured to transmit at least one signal according to a first communication protocol;
a memory configured to store a lookup table including waveform information; and
a processor configured to,
reference the lookup table in the memory to determine simulation waveform information simulating a second communication protocol different from the first communication protocol,
control the communication module to generate the at least one signal configured for Orthogonal Frequency-Division Multiplexing (OFDM) based on the simulation waveform information, the at least one signal corresponding to the first communication protocol, and
transmit the at least one signal through the communication module, the at least one signal including a data packet.

2. The electronic device of claim 1, wherein the processor is configured to:
determine a plurality of simulation waveform candidates based on the first communication protocol; and
select a first simulation waveform candidate with a smallest Quadrature Amplitude Modulation (QAM) quantization error among the plurality of simulation waveform candidates, the simulation waveform information corresponding to the first simulation waveform candidate.

3. The electronic device of claim 2, wherein the processor is configured to determine the plurality of simulation waveform candidates by adjusting a total phase rotation quantity of a target signal based on the second communication protocol.

12

4. The electronic device of claim 3, wherein the second communication protocol includes demodulation based on a phase difference between adjacent samples of a received signal.

5. The electronic device of claim 2, wherein the processor is configured to determine the plurality of simulation waveform candidates by adjusting a phase difference magnitude between samples of a target signal based on the second communication protocol.

6. The electronic device of claim 2, wherein the processor is configured to determine the plurality of simulation waveform candidates by adjusting an amplitude of a target signal based on the second communication protocol.

7. The electronic device of claim 1, wherein the second communication protocol comprises one of ZigBee® or Bluetooth®.

8. The electronic device of claim 1, wherein the first communication protocol comprises WiFi®.

9. An operating method of an electronic device including a communication module, a processor and a memory, the operating method comprising:
determining, by the processor, a plurality of simulation waveform candidates based on a first communication protocol;
selecting, by the processor, a first simulation waveform candidate having a smallest quadrature amplitude modulation (QAM) quantization error among the plurality of simulation waveform candidates;
storing, by the memory, a lookup table including waveform information corresponding to the first simulation waveform candidate;
referencing, by the processor, the lookup table in the memory to determine simulation waveform information simulating a second communication protocol different from the first communication protocol;
controlling, by the processor, the communication module to generate at least one signal configured for Orthogonal Frequency-Division Multiplexing (OFDM) based on the simulation waveform information, the at least one signal corresponding to the first communication protocol; and
transmitting, by the communication module, the at least one signal including a data packet.

10. The operating method of claim 9, wherein the at least one signal is generated to be differentially demodulated by a reception device based on the second communication protocol.

11. The operating method of claim 9, wherein the determining, by the processor a plurality of simulation waveform candidates comprises determining the plurality of simulation waveform candidates by adjusting a total phase rotation quantity of a target signal based on the second communication protocol.

12. The operating method of claim 9, wherein the determining, by the processor a plurality of simulation waveform candidates comprises determining the plurality of simulation waveform candidates by adjusting a phase difference magnitude between samples of a target signal based on the second communication protocol.

13. The operating method of claim 9, wherein the determining, by the processor a plurality of simulation waveform candidates comprises determining the plurality of simulation waveform candidates by adjusting an amplitude of a target signal based on the second communication protocol.

14. The operating method of claim 9, wherein the second communication protocol comprises one of ZigBee® or Bluetooth®.

15. The operating method of claim 9, wherein the first communication protocol comprises WiFi®.

16. A communication system comprising:

an electronic device including a memory, a processor, and a communication module, the electronic device operating according to a first communication protocol; and a reception device operating according to a second communication protocol, wherein the electronic device is configured to, store, by the memory, a lookup table including waveform information, reference, by the processor, the lookup table in the memory to determine simulation waveform information simulating the second communication protocol different from the first communication protocol, control, by the processor, the communication module to generate at least one signal modulated according to a Wi-Fi Standard based on the simulation waveform information, the at least one signal corresponding to the first communication protocol, and transmit, by the communication module, the at least one signal to the reception device, the at least one signal including a data packet, and wherein the reception device is configured to differentially demodulate the at least one signal based on the second communication protocol.

17. The communication system of claim 16, wherein the processor is configured to:

determine a plurality of simulation waveform candidates based on the first communication protocol; and select a first simulation waveform candidate with a smallest Quadrature Amplitude Modulation (QAM) quantization error among the plurality of simulation waveform candidates, the simulation waveform information corresponding to the first simulation waveform candidate.

18. The communication system of claim 16, wherein the processor is configured to determine a plurality of simulation waveform candidates by adjusting a total phase rotation quantity of a target signal based on the second communication protocol.

19. The communication system of claim 18, wherein the reception device is configured to demodulate the at least one signal into:

a first bit value in response to a phase difference between samples of the at least one signal increasing; and a second bit value in response to the phase difference between the samples of the at least one signal decreasing.

20. The communication system of claim 16, wherein the second communication protocol comprises one of ZigBee® or Bluetooth®.

* * * * *